United States Patent Office.

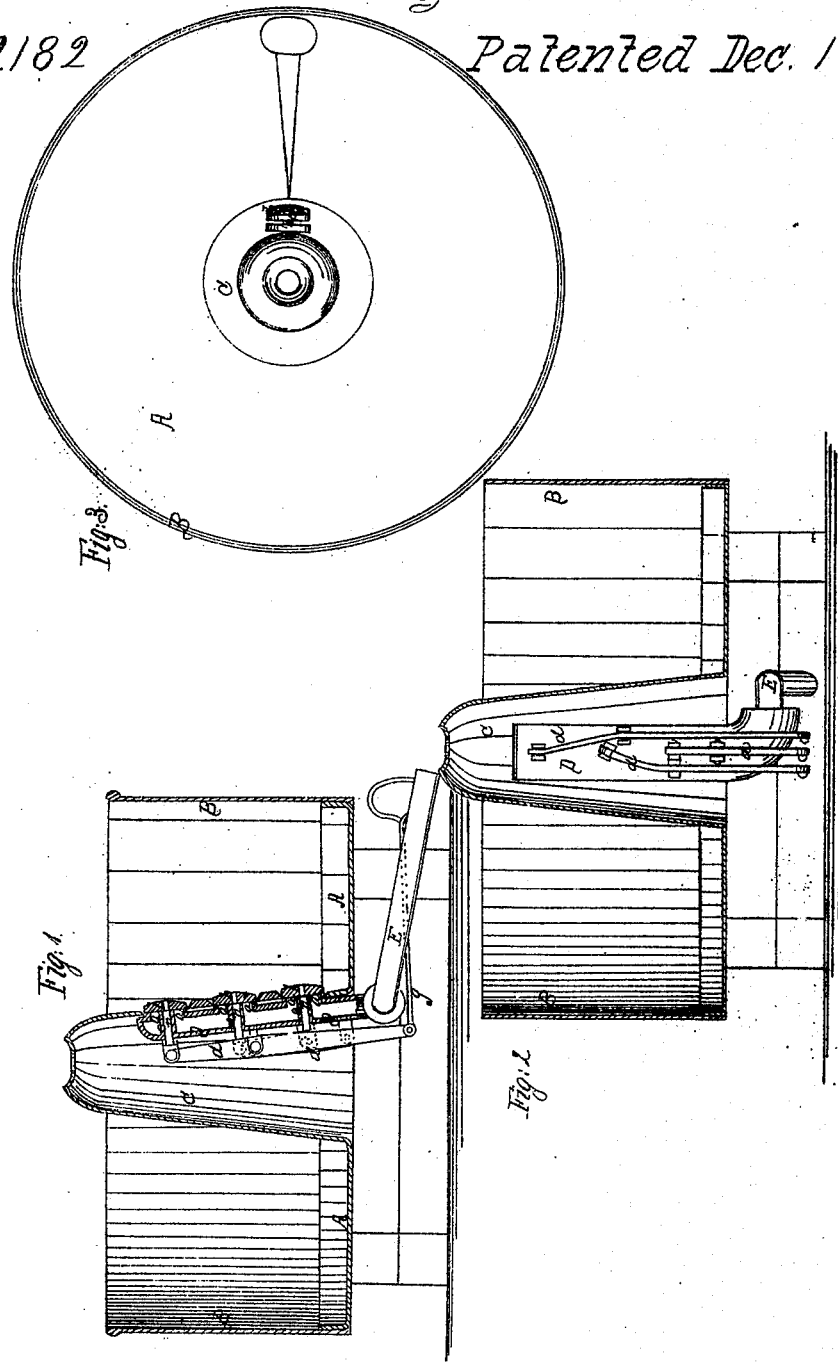

STEPHEN FOUNTAIN, OF SILVER CITY, NEVADA.

Letters Patent No. 72,182, dated December 17, 1867.

IMPROVED ORE-CONCENTRATOR AND AMALGAMATOR.

*The Schedule referred to in these Letters Patent and making part of the same.*

TO ALL WHOM IT MAY CONCERN:

Be it known that I, STEPHEN FOUNTAIN, of Silver City, county of Lyon, State of Nevada, have invented an Improved Central Discharge Concentrator and Amalgamator; and I do hereby declare the following description and accompanying drawings are sufficient to enable any person skilled in the art or science to which it most nearly appertains to make and use my said invention or improvement without further invention or experiment.

The object of my invention is to construct an improved variable central discharge for concentrators and amalgamators, by which the lighter and worthless contents can be easily discharged, as desired, while the heavy and more valuable portion, being thrown to the circumference of the containing-vessel by the centrifugal motion, are not in danger of being lost when the gates are open. Referring to the accompanying drawings, forming a part of this specification—

Figure 1 is a side sectional elevation of a settler and the discharge-gates.
Figure 2 is a sectional view showing the operating-levers.
Figure 3 is a plan.

Similar letters of reference in each of the figures indicate like parts.

A is the bottom of a settler, having the sides B and the central cone C, through which a shaft passes, and, by means of a yoke or similar device, turns the arms or agitators. Only sufficient of this is shown to explain my invention, the general details of settlers being similar in all. The cone C is pierced so that the flat hollow box D may be placed inside the cone, and be attached to it water-tight, or, if preferred, it may be cast with the cone and finished afterwards. The box D has three openings, $a\ a\ a$, through which the material to be discharged can pass into it, and thence downward through the pipe E. Each opening has a central boss, $c$, through which a stem or spindle, $n$, passes. One end of this spindle has fastened to it the valves $b\ b\ b$, while the other end is connected with the levers $d\ d\ d$, shown plainly in fig. 2. The levers $d\ d$ have the rods or handles $g\ g$ extending from their lower ends to the outside of the pan, below the bottom, so as to be convenient to be operated. The valves may be faced with rubber or other packing, so as to be tight.

I am aware that a central discharge has been used before, but it has been so constructed as to be very inconvenient and wasteful, while the discharge is apt to flow over the gearing and machinery, thus making it rusty and dirty. By using my improvement this is prevented, while the operator has perfect control of the valves, varying the discharge as may be required. Sliding gates may be used, but I consider the form shown as the best.

The centrifugal motion imparted to the contents of the pan tends to throw all the heavier particles of gold, mercury, and amalgam to the periphery, where they are collected and discharged into a bowl or receiving-vessel, while the lighter portion and the water are discharged, as they become thin enough, by the openings $a\ a\ a$.

What I claim as new, and desire to secure by Letters Patent, is—

The box D, having the valve $b$, stems $n$, or an equivalent device, together with their operating-levers $d$ and the rods $g$, the whole constructed and arranged substantially as and for the purposes herein described.

In witness whereof, I have hereunto set my hand and seal.

STEPHEN FOUNTAIN. [L. S.]

Witnesses:
C. W. M. SMITH,
GEO. H. STRONG.